United States Patent
Houser et al.

(10) Patent No.: US 10,808,832 B1
(45) Date of Patent: Oct. 20, 2020

(54) AXLE ASSEMBLY WITH FLUID STORAGE TANK

(71) Applicant: Dana Heavy Vehicle Systems Group, LLC, Maumee, OH (US)

(72) Inventors: Jordan M. Houser, Toledo, OH (US); Mark W. Leber, Holland, OH (US); Marcus W. Schmidt, Swanton, OH (US)

(73) Assignee: Dana Heavy Vehicle Systems Group, LLC, Maumee, OH (US)

( * ) Notice: Subject to any disclaimer, the term of this patent is extended or adjusted under 35 U.S.C. 154(b) by 0 days.

(21) Appl. No.: 16/527,154

(22) Filed: Jul. 31, 2019

(51) Int. Cl.
| | |
|---|---|
| *F16H 57/04* | (2010.01) |
| *B60B 35/16* | (2006.01) |
| *B60B 35/18* | (2006.01) |
| *F04B 43/08* | (2006.01) |
| *F16C 33/76* | (2006.01) |
| *B60K 31/06* | (2006.01) |

(52) U.S. Cl.
CPC ....... *F16H 57/0483* (2013.01); *B60B 35/163* (2013.01); *B60B 35/18* (2013.01); *B60K 31/06* (2013.01); *F04B 43/08* (2013.01); *F16C 33/766* (2013.01); *F16H 57/0409* (2013.01); *F16H 57/0421* (2013.01); *F16H 57/0423* (2013.01); *F16H 57/0434* (2013.01); *F16H 57/0435* (2013.01); *F16H 57/0457* (2013.01)

(58) Field of Classification Search
CPC ............. F16H 57/0483; F16H 57/0423; F16H 57/0435; F16H 57/0409; F16H 57/0434; F16H 57/0457; F16H 57/0421; B60B 35/16; B60B 35/163
See application file for complete search history.

(56) References Cited

U.S. PATENT DOCUMENTS

| | | | |
|---|---|---|---|
| 6,345,962 B1 | 2/2002 | Sutter | |
| 8,858,381 B2 | 10/2014 | Trost | |
| 9,103,433 B2 | 8/2015 | Kwasniewski | |
| 9,358,879 B1 | 6/2016 | Bennett | |
| 9,908,407 B1 | 3/2018 | Bennett | |
| 10,036,467 B2 | 7/2018 | Keane | |
| 10,190,673 B2 * | 1/2019 | Creech | F16H 57/045 |
| 10,279,625 B2 * | 5/2019 | Kelly | F16H 57/032 |

FOREIGN PATENT DOCUMENTS

WO     2018069163     4/2018

* cited by examiner

*Primary Examiner* — Luis A Gonzalez
(74) *Attorney, Agent, or Firm* — Marshall & Melhorn, LLC

(57) ABSTRACT

An axle assembly having an axle housing including a differential assembly having a ring gear and a lubrication directing assembly disposed directly adjacent to the ring gear. The lubrication directing assembly having a first lubrication flow surface, a second lubrication flow surface, and a trough. The axle assembly also includes an axle housing cover surrounding the axle housing. A fluid storage tank is attached to the housing cover, wherein the fluid storage tank includes a fill channel directly attached to the rear housing cover; an expandable air bladder disposed in the fluid storage tank; and a first valve disposed below the air bladder and in contact with the air bladder.

18 Claims, 7 Drawing Sheets

AXLE ASSEMBLY WITH FLUID STORAGE TANK

FIELD

The present disclosure generally relates to an axle assembly including a fluid storage tank, and specifically relates to an axle assembly including a lubrication fluid storage tank having an expandable bladder.

BACKGROUND

Axle assemblies have internal cavities housing gear assemblies that must be properly lubricated to avoid premature wear and failure. The internal cavities must be filled with a certain level of lubrication fluid so that the gear assemblies can be lubricated as gear components rotate within the internal cavity. This is particularly the case during vehicle startup for certain components, such as differentials and power distribution units.

Lubrication fluid often collects at the ring gear and the lubricant sump in conventional axle assemblies. As a result, these axle assemblies experience churning losses and inefficiencies. It would therefore be advantageous to readily reduce the amount of lubrication fluid in some components of axle assemblies, while providing the lubrication fluid to other axle assembly components that require lubrication fluid during certain events, such as vehicle startup.

SUMMARY

In an embodiment, an axle assembly having an axle housing with a center portion defining a sump and one or more axle shaft housings extending from the center portion. The axle housing includes a differential assembly having a ring gear, wherein the ring gear has a front side and a back side; and a lubrication directing assembly disposed directly adjacent to the ring gear. The lubrication directing assembly includes a first portion having a first lubrication flow surface, a second portion having a second lubrication flow surface, and a third portion having a trough, wherein the second portion is interposed between the first portion and the trough. The axle assembly also includes an axle housing cover surrounding the axle housing, wherein the axle housing cover includes a rear housing cover and an opposing front housing cover. A fluid storage tank is attached to the housing cover, wherein the fluid storage tank includes a fill channel directly attached to the housing cover; an expandable air bladder disposed in the fluid storage tank; and a first valve disposed below the air bladder and in contact with the air bladder.

In some embodiments, the first valve is a bleeder valve and the bleeder valve is configured to inflate and drain the air bladder.

In some embodiments, the axle assembly comprises a second valve disposed within the fill channel. The second valve may be a one-way check valve.

In an embodiment, the combination of the lubrication fluid baffle and the trough portion is configured to collect and direct lubrication fluid within the axle housing. The fluid storage tank is configured to collect and store lubrication fluid and to return lubrication fluid to the sump portion of the axle housing.

BRIEF DESCRIPTION OF THE DRAWINGS

The above, as well as other advantages of the present disclosure, will become readily apparent to those skilled in the art from the following detailed description when considered in light of the accompanying drawings in which.

DETAILED DESCRIPTION

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

Disclosed herein is an axle assembly with a lubrication fluid tank that may be used in automotive, off-road vehicle, all-terrain vehicle, construction, and structural applications. As a non-limiting example, the axle assembly with a lubrication fluid tank disclosed herein may also be used in passenger vehicle, electric vehicle, hybrid vehicle, commercial vehicle, autonomous vehicles, semi-autonomous vehicles and/or heavy vehicle applications. The axle assembly disclosed herein may be a single axle assembly or may be configured as part of a tandem axle assembly, a tridem axle assembly, and/or an electric axle assembly.

For description purposes, the terms "prime mover", "engine," "electric machine," and like terms, are used herein to indicate a power source. Said power source could be fueled by energy sources including hydrocarbon, electrical, solar, and/or pneumatic, to name but a few. Although typically described in a vehicle or automotive application, one skilled in the art will recognize the broader applications for this technology and the use of alternative power sources for driving a transmission including this technology.

FIGS. 1-5 show views of an axle assembly 10 attached to a first embodiment of a fluid storage tank 42. In some embodiments, the axle assembly 10 is a forward drive axle. In other embodiments, the axle assembly 10 is a rear drive axle.

Figure 1:
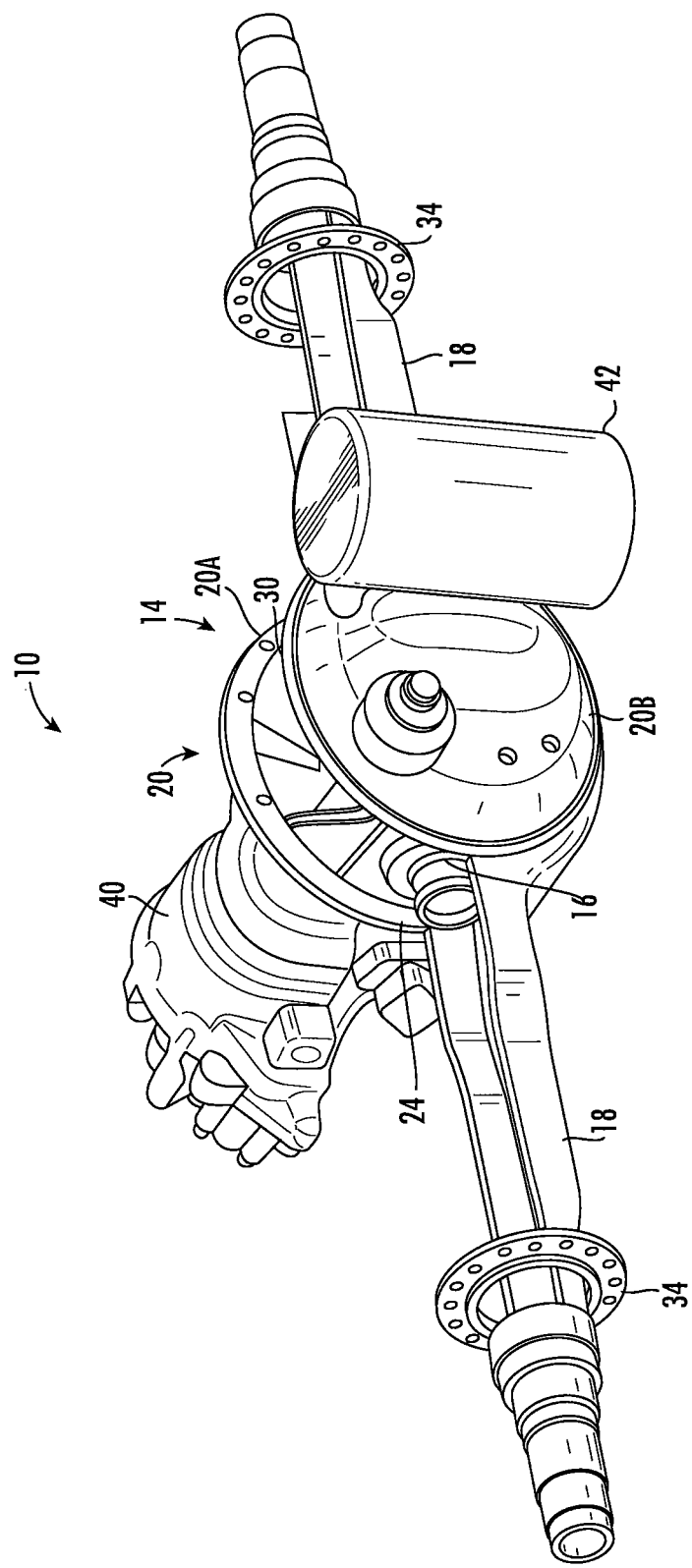
FIG. 1 illustrates a schematic perspective view of an exemplary axle assembly including a first embodiment of a fluid storage tank.

As best shown in FIG. 1, the axle assembly 10 may include an axle housing 14, a differential assembly 16, and one or more axle shaft housings 18. In accordance with the embodiment illustrated in FIG. 1 of the disclosure and as a non-limiting example, at least a portion of the two axle shaft housings 18 may be integrally connected to opposing ends of the axle housing 14. Each of the axle shaft housings 18 may be of a size and shape to receive portions of axle shafts (not shown) therein. The axle shaft housings 18 may each have a hollow configuration or a tubular configuration that may extend around the axle shafts. The axle shafts may be drivingly connected to at ends of the differential assembly 16. The axle housing 14 may have a size and a shape to receive and/or retain various components of the axle assembly 10.

As best shown in FIG. 1, the axle housing 14 may also be surrounded by an axle housing cover 20. The axle housing cover 20 may include a front housing cover 20A and an opposing rear housing cover 20B. The front housing cover 20A and the rear housing cover 20B may be mated together to fully surround the axle housing 14.

As best shown in FIG. 1 and as a non-limiting example, the axle housing 14 includes a center portion 24, wherein the axle shaft housings 18 extend in opposite directions from the center portion 24. The center portion 24 may be disposed proximate the center of the axle housing 14. The center portion 24 may define a cavity 30 that may receive the differential assembly 16.

Figure 2:
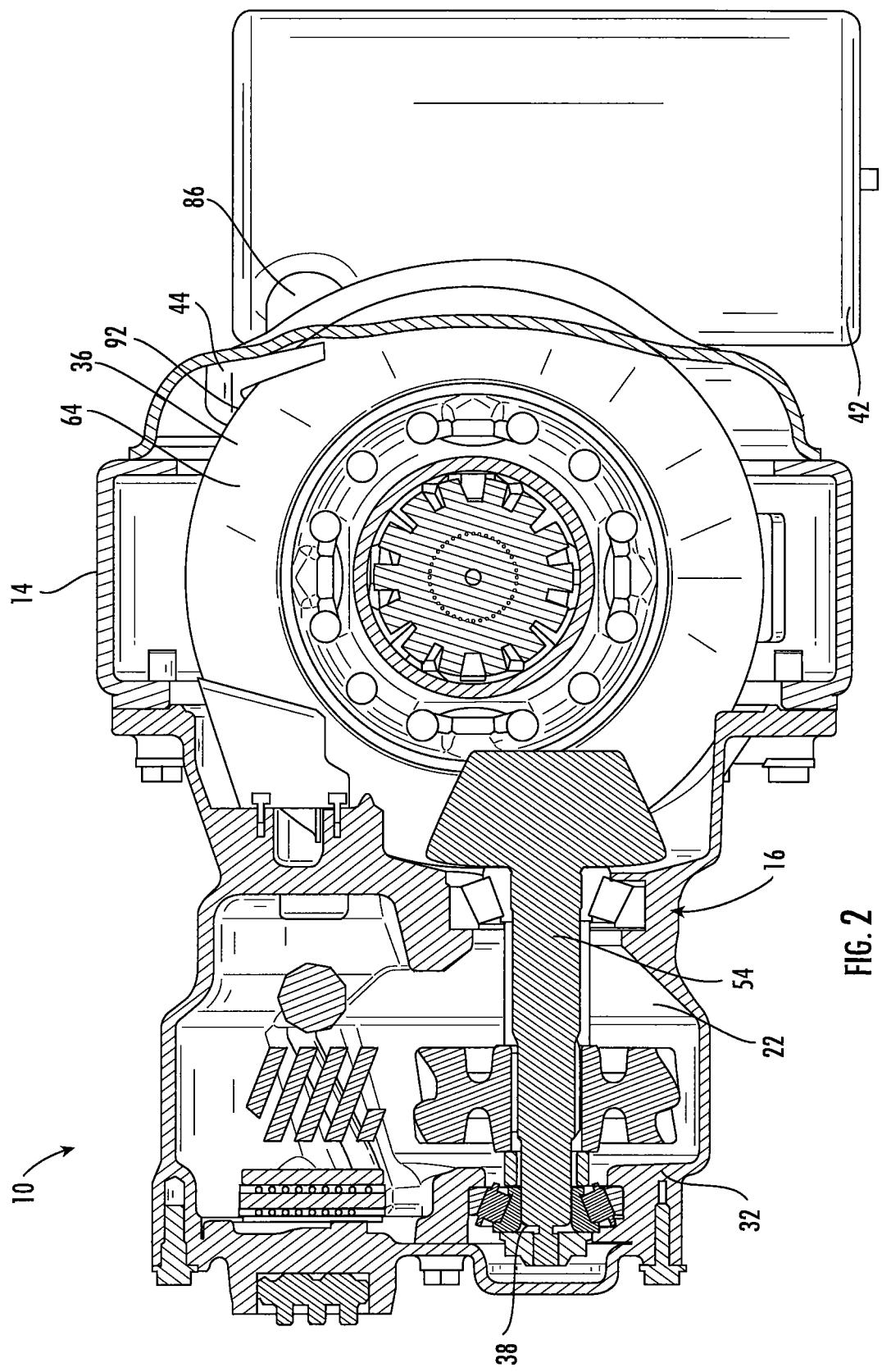
FIG. 2 illustrates a schematic cross-sectional view of a portion of the axle assembly attached to the fluid storage tank as illustrated in FIG. 1.

As best shown in FIG. 2, a region of the cavity 30 may be located below the differential assembly 16 and may at least partially define a sump portion 32 that may contain lubrication fluid (not shown), such as oil. Splashed lubrication fluid may flow down the sides of the center portion 24 and may flow over internal components of the axle assembly 10 and gather in the sump portion 32. The lubrication fluid may lubricate components of the axle assembly 10, such as the differential assembly 16, a power distribution unit (PDU), and various bearings.

As best shown in FIG. 1 and as a non-limiting example, brake flanges 34 are disposed proximate to ends of the axle shaft housings 18. The brake flanges 34 may facilitate coupling of the axle shafts via one or more wheel hubs (not shown) and one or more brakes (not shown) to the axle shaft housings 18 in order to provide braking.

As best shown in FIGS. 1 and 2 and as a non-limiting example, the differential assembly 16 may be disposed in the center portion 24 of the axle housing 14. A differential case 22 may surround the components of the differential assembly 16. The differential assembly 16 also includes a ring gear 36 interposed between the differential case 22 and a differential unit 38. The ring gear 36 may receive torque from another gear, such as a pinion gear 54, and transmit torque to the differential unit 38, which is configured to provide torque to the axle shafts 18. The ring gear 36 may also be configured to splash lubrication fluid that accumulates at the sump portion 32 to various components of the differential assembly 16 that may require lubrication during operation.

Rotational energy is provided to the axle assembly 10 through an input shaft 40 that is rotated by a prime mover (not shown). The input shaft 40 may be coupled to a vehicle drivetrain component, such as a drive shaft. Alternatively, the input shaft 40 may be operatively connected to an output of another axle assembly. The input shaft 40 is disposed through the front housing cover 20A.

Figure 3:
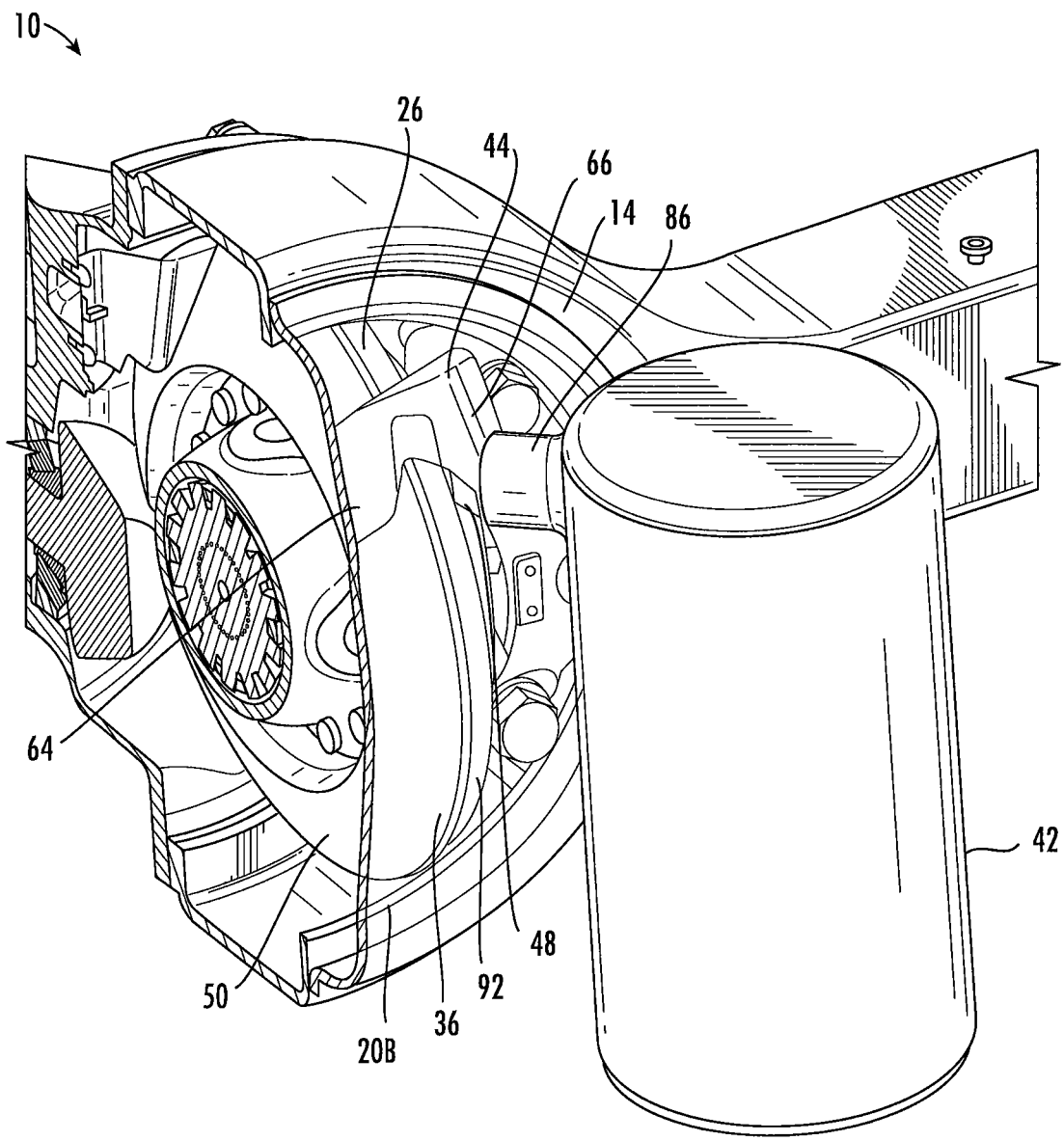
FIG. 3 illustrates another schematic sectional view of the portion of the axle assembly attached to the fluid storage tank as illustrated in FIGS. 1 and 2.

As best shown in FIGS. 1-3, a storage receptacle, such as a fluid storage tank 42, is attached to a portion of the housing cover 20 and adjacent to the ring gear 36. In this embodiment, the fluid storage tank 42 is attached to a portion of the housing cover 20B disposed on the opposite side of the input shaft 40. In an embodiment, the fluid storage tank 42 has a cylindrical shape. One of ordinary skill in the art, though, would appreciate that the lubrication fluid tank 42 may also have other configurations that allow for fluid storage. The fluid storage tank 42 is configured to collect and store lubrication fluid and to return lubrication fluid to the sump portion 32.

FIGS. 2 and 3 show sectional views of the fluid storage tank 42 attached to the center portion 24 of the axle housing 14. In this embodiment, a lubrication directing assembly 44 is integrated within the axle housing 14 and is disposed against the ring gear 36. In another embodiment, the lubrication directing assembly 44 is disposed directly adjacent to the ring gear 36 within the axle housing 14. The lubrication directing assembly 44 is configured to take lubrication fluid from various rotating components in the axle housing 14, such as the ring gear 36, and to direct it into the fluid storage tank 42.

Figure 4:
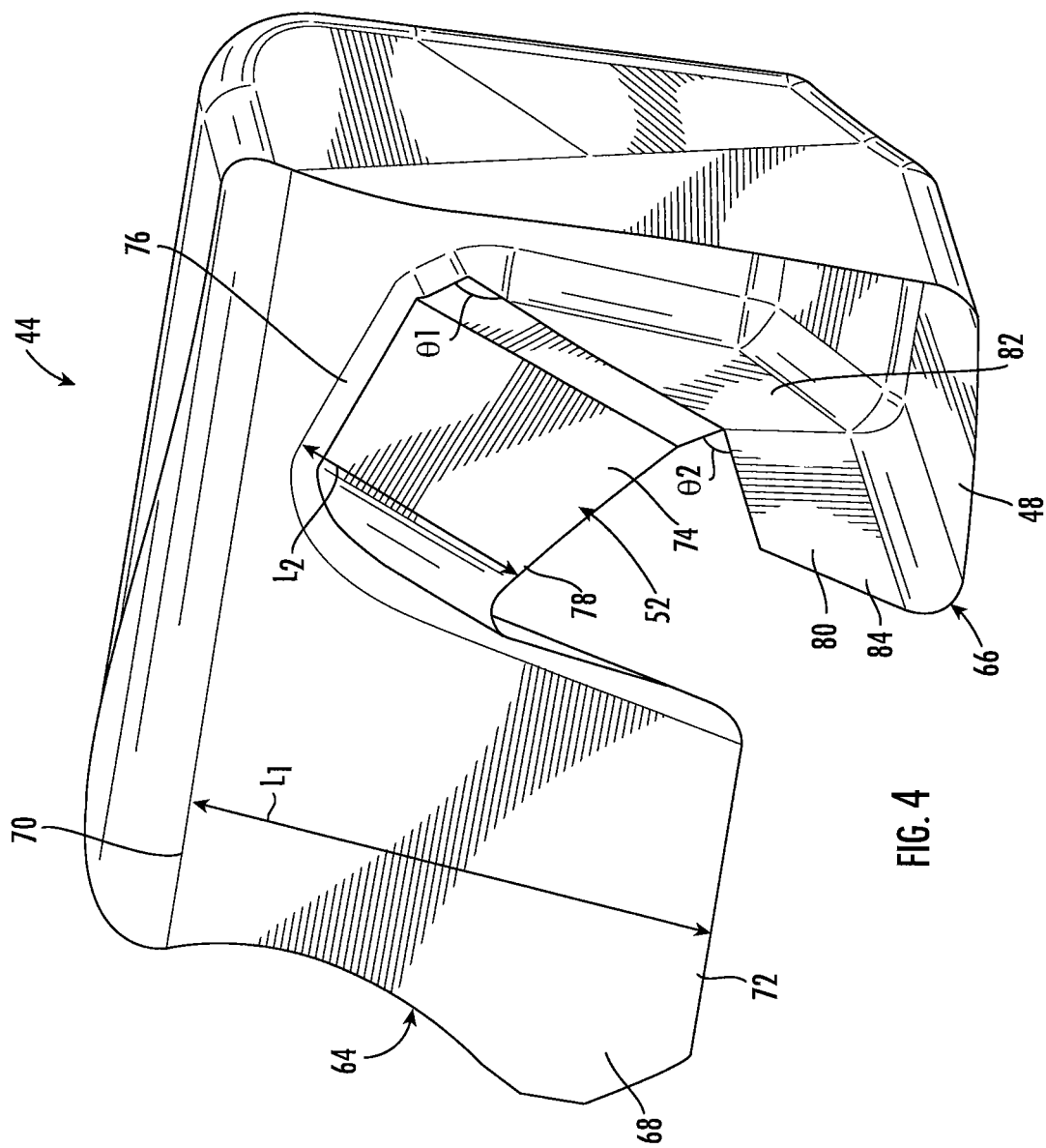
FIG. 4 illustrates a schematic perspective view of a lubrication directing assembly illustrated in FIGS. 2 and 3.

As best shown in FIGS. 3 and 4 and as a non-limiting example, the lubrication directing assembly 44 includes a first portion 64 in contact with a front side 50 of the ring gear 36, an opposing third portion 66 in contact with a back side 26 of the ring gear 36, and a second portion 52 interposed between the first portion 64 and the third portion 66. In some embodiments, the first portion 64 is directly proximate to the front side 50 of the ring gear 36 and the third portion 66 is directly proximate to the back side 26 of the ring gear 36.

The first portion 64 includes a first lubrication flow surface 68, wherein the first lubrication flow surface 68 is substantially flat. The first portion 64 also includes a top end 70 and a bottom end 72, and a length L1 extending from the top end 70 to the bottom end 72. The first lubrication flow surface 68 may aid in collecting lubrication fluid from the ring gear 36 and directing it to the second portion 52.

As best shown in FIG. 4, the second portion 52 may have a reduced diameter with respect to each of the first portion 64 and the third portion 66. The second portion 52 includes a second lubrication flow surface 74, wherein the second lubrication flow surface 74 may be substantially concave. The second portion 52 also includes a top end 76 and a bottom end 78, and a length L2 extending from the top end 76 and the bottom end 78. In an embodiment, L1 is approximately two times greater than L2. As a result, the second portion 52 may be directly proximate to or in contact with an outer surface 92 of the ring gear 36 such that the second portion 52 is straddling, but not directly attached to, the ring gear 36. The lubrication directing assembly 44 may then readily wipe lubrication fluid from the front side 50 and the outer surface 92 of the ring gear 36 and direct the lubrication fluid to the third portion 66.

As best shown in FIG. 4, the third portion 66 includes a third lubrication flow surface 80, wherein the third lubrication flow surface 80 defines a trough 48 extending away from the ring gear 36. The trough 48 includes a first segment 82 extending at a first angle $\theta 1$ and a second segment 84 extending at a second angle $\theta 2$ with respect to the first portion 64, wherein the first angle $\theta 1$ is different than the second angle $\theta 2$. As a non-limiting example, the first angle $\theta 1$ may be approximately between about 120 and 180 degrees and the second angle $\theta 2$ may be approximately between about 90 and 120 degrees. The trough 48 is configured to collect lubrication fluid and direct it away from the axle housing 14 and to the fluid storage tank 42. One of ordinary skill in the art would understand that other configurations are possible for the trough 48.

In some embodiments, the lubrication directing assembly 44 may be made of high strength, low alloy, sheet metal steel, although other materials could be used if desired, for example, other metallic materials, such as aluminum, or high temperature polymeric materials.

In some embodiments, after lubrication fluid is removed from the ring gear 36, the lubrication fluid may flow up the first lubrication flow surface 68, into the second lubrication flow surface 74, into the trough 48, and into the fluid storage tank 42.

Figure 5:
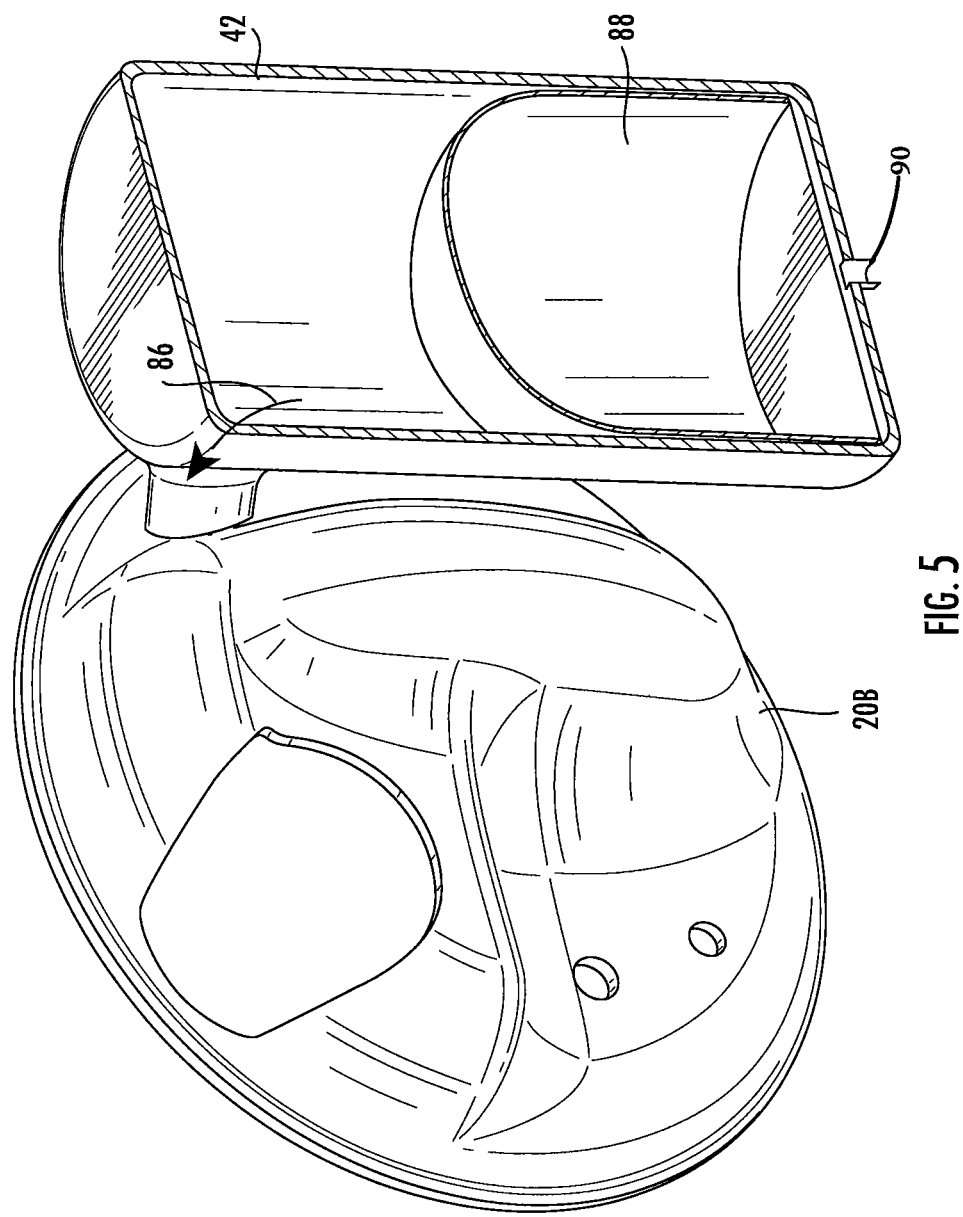
FIG. 5 illustrates a schematic sectional view of a portion of the fluid storage tank illustrated in FIGS. 1 and 2 attached to a portion of the axle assembly illustrated in FIGS. 1-3.

Referring to FIG. 5, the attachment of the fluid storage tank 42 to the rear housing cover 20B is shown. The fluid storage tank 42 may be attached to the housing cover 20B via a fill channel 86, wherein the fill channel 86 is directly attached to the housing cover 20B. In an embodiment, the fill channel 86 may receive lubrication fluid from the trough 48 and may return lubrication fluid back to the sump portion 32.

As best shown in FIG. 5 and as a non-limiting example, the fluid storage tank 42 comprises an expandable air bladder 88 disposed therein. The fluid storage tank 42 further comprises a first valve 90 disposed below the air bladder 88 at the bottom of the fluid storage tank 42. In an embodiment, the first valve 90 is a bleeder valve.

At desired conditions, such as startup events, the air bladder 88 is configured to inflate and to purge the fluid storage tank 42 of lubrication fluid. As a result, lubrication fluid is returned to the sump portion 32 and provides lubrication fluid to desired components of the axle assembly 10, such as the differential assembly 16, a power distribution unit (PDU), and various bearings, via the fill channel 86. The first valve 90 is configured to allow air to slowly drain the air bladder 88 once it is inflated. The fluid storage tank 42 can then be filled with lubrication fluid from the axle housing 14 and drained again.

When less lubrication fluid is needed in the axle housing 14, such as when a vehicle reaches a certain speed, the air bladder 88 is deflated via the first valve 90. As a result, lubrication fluid may be continuously removed from the sump portion 32 and the ring gear 36 to lower the lubrication fluid volume and to fill the fluid storage tank 42. Some of the benefits achieved from reducing the presence of lubrication fluid are improved vehicle efficiency, while maintaining proper temperature and lubricant life in the vehicle.

Figure 6:
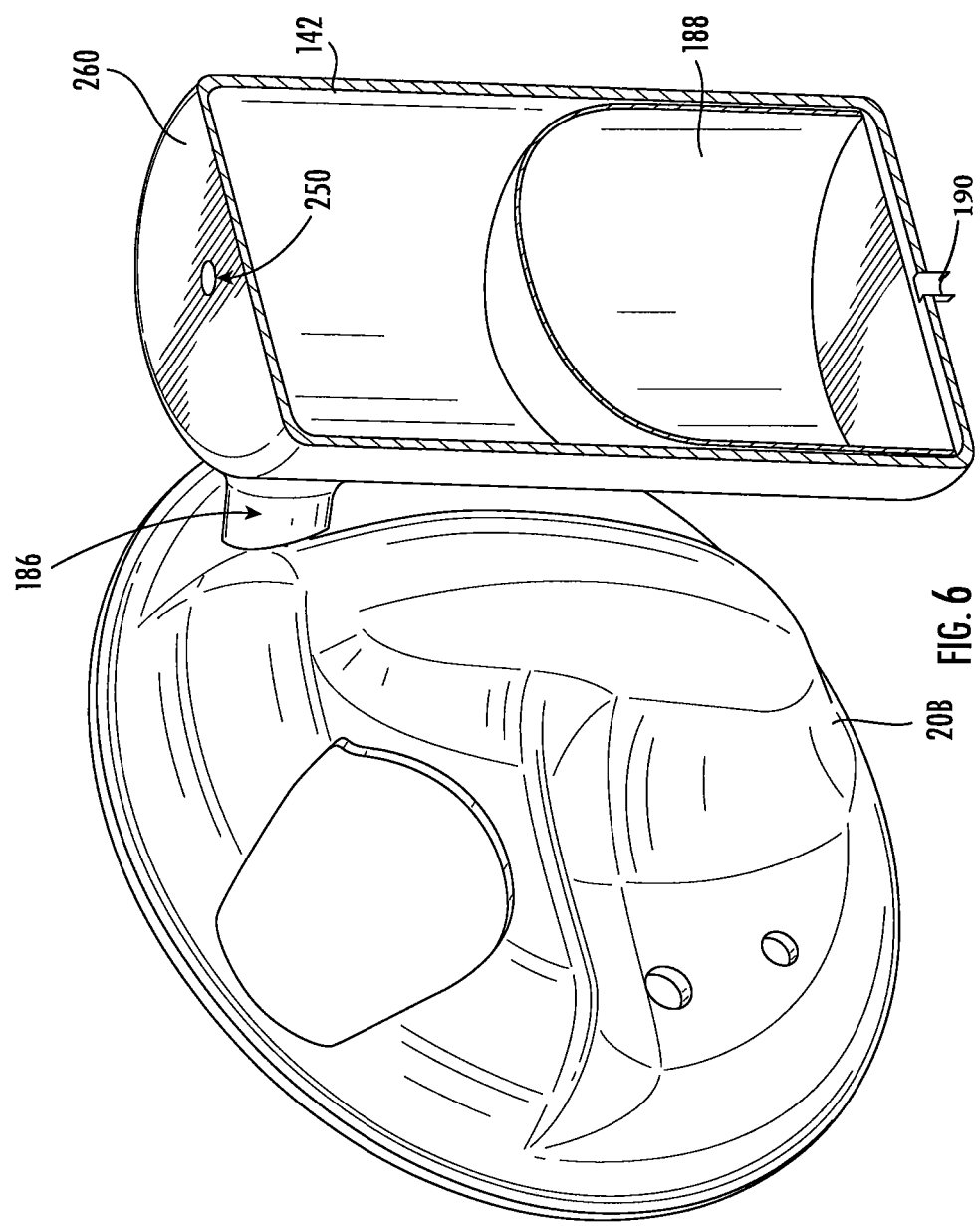
FIG. 6 illustrates a schematic sectional view of a second embodiment of a fluid storage tank attached to a portion of the axle assembly illustrated in FIGS. 1-3 and 5.

FIG. 6 shows a sectional view of a second embodiment of a fluid storage tank 142 attached to a portion of the axle assembly 10. The fluid storage tank 142 comprises an expandable air bladder 188 disposed therein and a first valve 190 disposed bellow the air bladder 188 at the bottom of the fluid storage tank 142. In an embodiment, the first valve 190 is a bleeder valve. The fluid storage tank 142 further comprises a second valve 278 disposed in a fill channel 186, wherein the fill channel 186 is attached to at least a portion of the housing cover 20B. In an embodiment the second valve 278 is a check valve.

In an embodiment, the fluid storage tank 142 may also include a port 250 disposed on a top surface 260 of the fluid storage tank 142. The port 250 is configured to aid in pumping lubrication fluid to certain components in the axle housing 14. In some embodiments, the port 250 provides a connection point for tube or lubrication fluid lines to route lubrication fluid directly to desired locations on the axle assembly 10.

At desired conditions, such as startup events, the air bladder 188 is configured to inflate and to purge the fluid storage tank 142 of lubrication fluid. As a result, lubrication fluid is returned to the sump portion 132 and provides lubrication fluid to desired components of the axle assembly 10, such as the differential assembly 16, a power distribution unit (PDU), and various bearings, via the fill channel 186. The first valve 190 is configured to allow air to slowly drain the air bladder 188 once it is inflated. The fluid storage tank 142 can then be filled with lubrication fluid from the axle housing 14 and drained again.

When less lubrication fluid is needed in the axle housing 14, such as when a vehicle reaches a certain speed, the air bladder 188 is deflated via the first valve 190. As a result, lubrication fluid may be continuously removed from the sump portion 32 and the ring gear 36 to lower the lubrication fluid volume and to fill the fluid storage tank 42. Some of the benefits achieved from reducing the presence of lubrication fluid are improved vehicle efficiency, while maintaining proper temperature and lubricant life in the vehicle.

Figure 7:
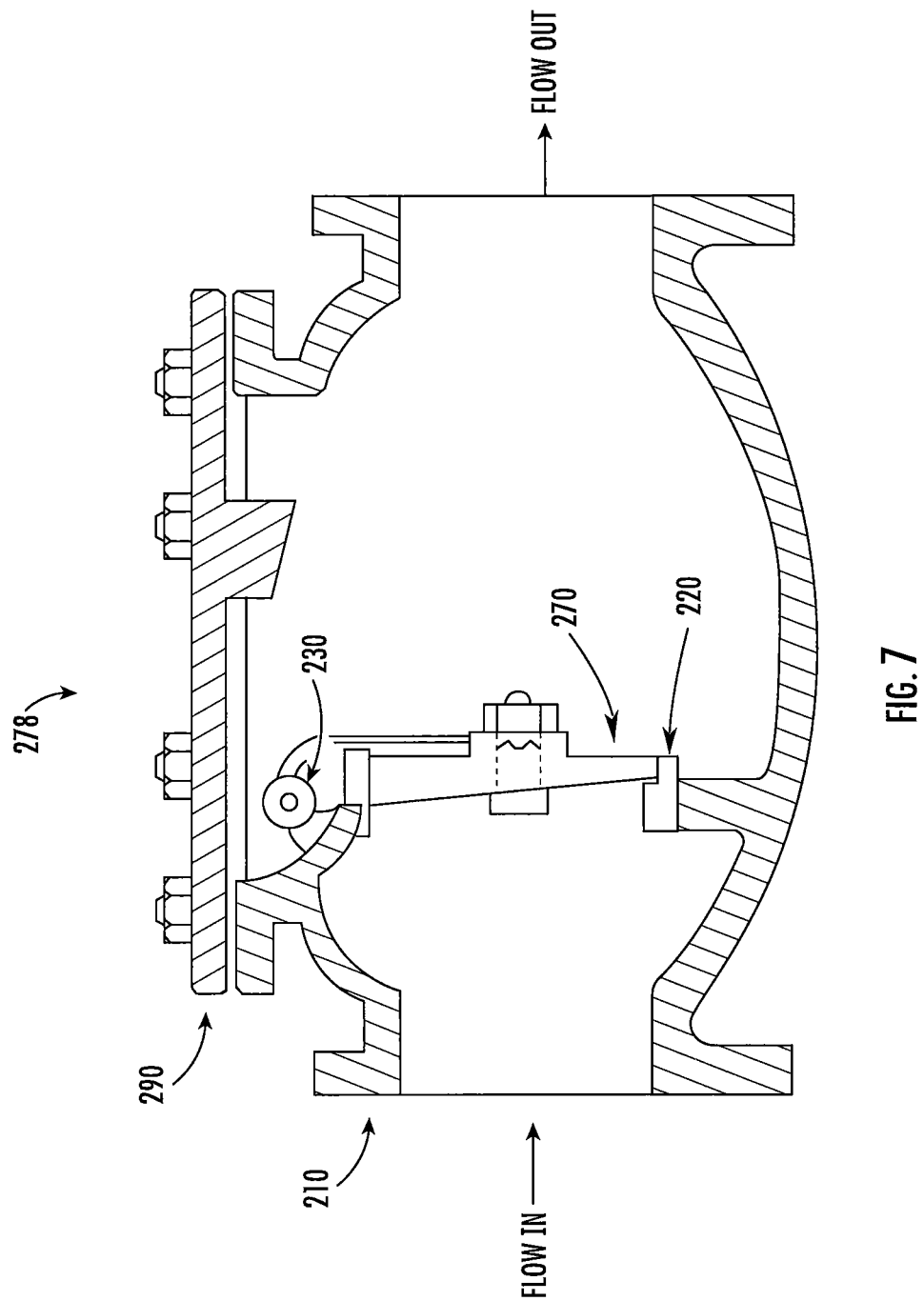
FIG. 7 illustrates a schematic sectional view of a valve disposed in the fluid storage tank illustrated in FIG. 6.

FIG. 7 shows a sectional view of the second valve 278 disposed in the fill channel 186. The second valve 278 includes a body 210 and a cover 290 positioned on top of the body 210. The body 210 comprises a hinge 230, a scat 220, and a disc 270 interposed between the hinge 230 and the scat 220. The disc 270 may include a flap portion 280 that is configured to seal itself against the scat 220. As a result, the disc 270 is adapted to only permit lubrication fluid to flow in one direction, but not in the other direction. The one-way second valve 278 may then prevent backflow of the lubrication fluid when the air bladder 188 is inflated. Instead, the lubrication fluid is forced through tubing to pump lubrication fluid to various locations in the axle housing 14, such as the PDU, the differential assembly 16, and various bearings.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be noted that this invention can be practiced in other ways than those specifically illustrated and described without departing from the spirit or scope of this invention.

What is claimed is:

1. An axle assembly comprising:
   an axle housing having a center portion defining a sump and one or more axle shaft housings extending from the center portion, wherein the axle housing comprises:
      a differential assembly having a ring gear, wherein the ring gear has a front side and a back side; and
      a lubrication directing assembly disposed directly adjacent to the ring gear;
   an axle housing cover surrounding the axle housing; and
   a fluid storage tank attached to the housing cover, wherein the fluid storage tank comprises:
      a fill channel directly attached to the housing cover;
      an expandable air bladder disposed in the fluid storage tank; and
      a first valve disposed below the air bladder and in contact with the air bladder.

2. The axle assembly of claim 1, wherein the lubrication directing assembly comprises a first portion having a first lubrication flow surface, a second portion having a second lubrication flow surface, and a third portion having a trough, wherein the second portion is interposed between the first portion and the trough.

3. The axle assembly of claim 1, wherein the first valve is a bleeder valve and wherein the bleeder valve is configured to inflate and to drain the air bladder.

4. The axle assembly of claim 2, wherein the second portion is directly proximate to an outer surface of the ring gear.

5. The axle assembly of claim 2, wherein the first portion is in direct proximity with the front side of the ring gear.

6. The axle assembly of claim 5, wherein the third portion is in direct proximity with the back side of the ring gear.

7. The axle assembly of claim 2, wherein the trough includes a first segment extending at a first angle away from the ring gear and a second segment extending at a second angle away from the ring gear.

8. The axle assembly of claim 7, wherein the first angle is different from the second angle.

9. The axle assembly of claim 2, wherein the trough is connected to the fill channel.

10. The axle assembly of claim 2, wherein the second lubrication flow surface has a reduced diameter as compared with the diameters of the first lubrication flow surface and the third lubrication flow surface.

11. The axle assembly of claim 1, further comprising a second valve disposed within the fill channel.

12. The axle assembly of claim 11, wherein the second valve is a one-way check valve.

13. The axle assembly of claim 12, wherein the check valve comprises a disc configured to selectively seal itself.

14. The axle assembly of claim 13, wherein the direction of flow of lubrication fluid in the axle assembly is determined based on whether the disc is sealed within the check valve.

15. The axle assembly of claim 1, wherein the air bladder includes lubrication fluid.

16. An axle assembly comprising:
an axle housing having a center portion defining a sump and one or more axle shaft housings extending from the center portion, wherein the axle housing comprises:
 a differential assembly having a ring gear, wherein the ring gear has a front side and a back side; and
 a lubrication directing assembly disposed directly adjacent to the ring gear;
an axle housing cover surrounding the axle housing, wherein the axle housing cover includes a rear housing cover and an opposing front housing cover; and
a fluid storage tank attached to the housing cover, wherein the fluid storage tank comprises:
 a fill channel directly attached to the housing cover;
 an expandable air bladder disposed in the fluid storage tank;
 a first valve disposed below the air bladder and in contact with the air bladder; and
 a second valve disposed within the fill channel.

17. The axle assembly of claim 16, wherein the lubrication directing assembly comprises a first portion having a first lubrication flow surface, a second portion having a second lubrication flow surface, and a third portion having a trough, wherein the second portion is interposed between the first portion and the trough.

18. The axle assembly of claim 16, wherein the first valve is a bleeder valve and the second valve is a one-way check valve.

* * * * *